Nov. 29, 1932.  S. A. AYRES  1,889,233
ARTICLE HANDLING DEVICE
Filed May 14, 1928
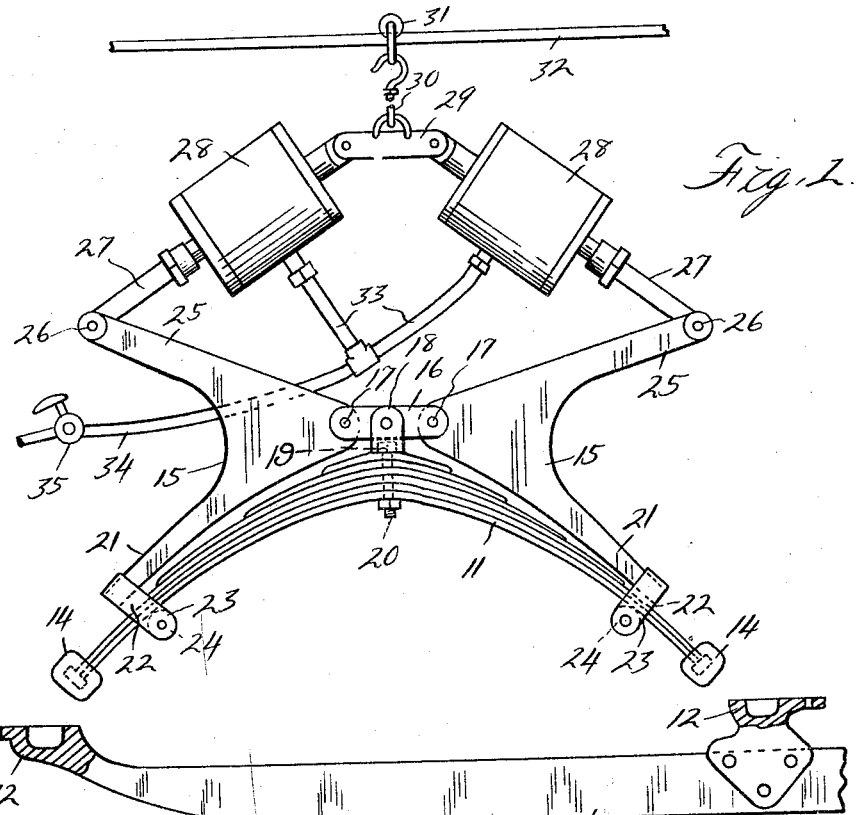
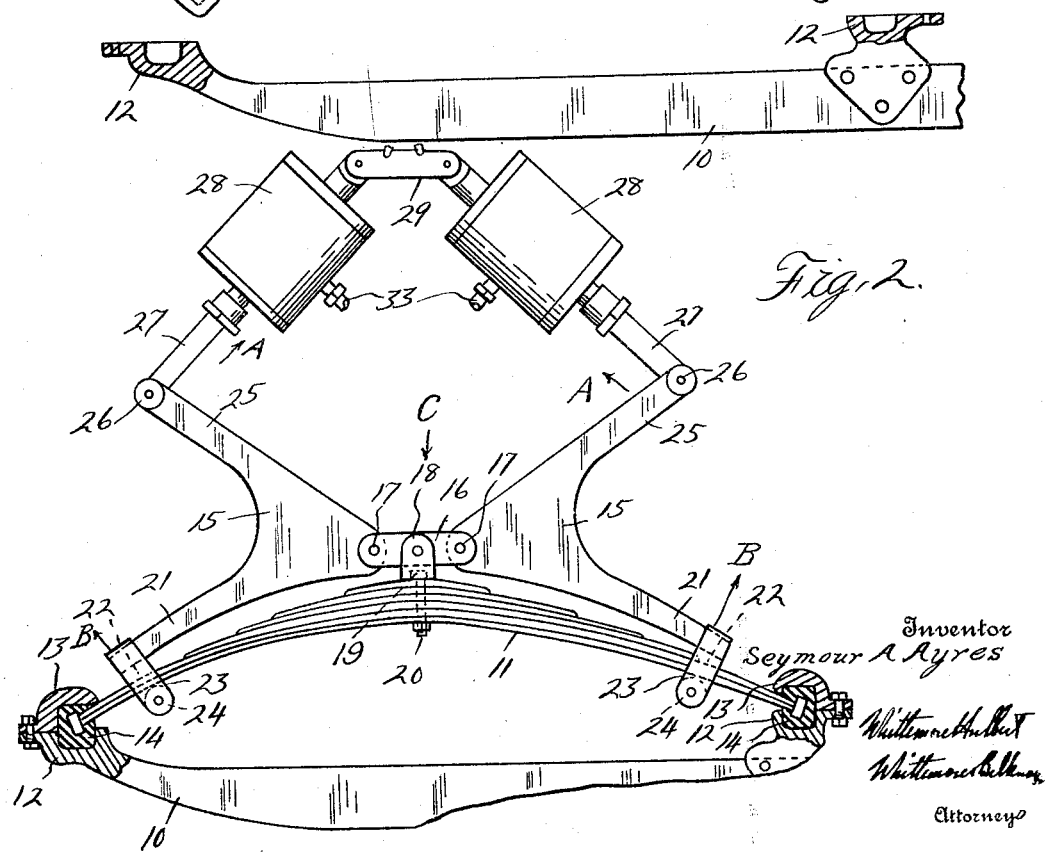
Inventor
Seymour A Ayres
Attorneys Patented Nov. 29, 1932

1,889,233

UNITED STATES PATENT OFFICE

SEYMOUR A. AYRES, OF LANSING, MICHIGAN, ASSIGNOR TO REO MOTOR CAR COMPANY, OF LANSING, MICHIGAN, A CORPORATION OF MICHIGAN

ARTICLE HANDLING DEVICE

Application filed May 14, 1928. Serial No. 277,685.

This invention relates to article handling devices and more particularly to improvements therein tending to simplify, render more efficient and improve the same generally.

While from the nature of the device as will be apparent more fully hereinafter it will be apparent that the same may be used in various connections, the device finds particular utility when used in connection with springs such as vehicle springs.

In mounting vehicle springs upon the chassis or frame of vehicles, it is necessary, in many types of installation, to flex the spring in a direction to straighten or lengthen the same in order that the ends of the springs may be caused to engage and be secured to the supporting mountings or brackets therefor. This is particularly true in making installation of springs of the type in which the ends thereof are mounted or supported in rubber or resilient bushings.

In accordance with the present invention means is provided whereby the spring may be readily engaged and subsequently flexed or straightened to such an extent that it will facilitate the engagement of the ends of the springs with the supporting brackets whereupon the handling device may be readily released and caused to grapple or engage another spring.

Various other objects, advantages and novel details of construction of the invention will be made more apparent as this description proceeds, especially when considered in connection with the accompanying drawing wherein one illustrative embodiment of the invention is shown and wherein:

Figure 1 is a side elevational view of a handling device constructed in accordance with my invention showing the device engaging the spring before the spring has been flexed or straightened, and Figure 2 is a similar view with the parts in different position and the spring flexed into position where its ends may be engaged with the spring supporting brackets.

In accordance with the present invention and in order to show one of the utilitarian applications of the present invention I have illustrated fragmentarily the frame 10 of for instance a motor vehicle to which the spring 11 is adapted to be connected. The frame 10 is shown inverted or in other words up-side-down as in instances of this nature it is customary to install the spring upon the frame from above. Associated with the frame 10 are the halves 12 of spring supporting members or brackets, with which companion bracket members 13 are adapted to be associated to provide socket-like housings for receiving the rubber enclosed ends 14 of the spring 11. Obviously the particular nature or character of the supporting brackets or the particular construction of the spring or ends thereof form no part of the present invention and are shown herein for illustrative purposes only.

The problem involved is that of flexing or bending the spring so as to straighten or lengthen the same whereby the ends 14 thereof may be brought into position where they may be lodged within the receiving or supporting sockets. To this end I propose employing a pair of substantially bell crank shaped members 15 pivotally connected together as for instance by means of a link 16, the ends of which are pivotally connected as at 17 respectively to the members 15. The link 16 is preferably provided with a socket either formed therein or formed in a separate member 18 connected thereto which socket is adapted to receive and accommodate the head 19 of the usual bolt 20 extending through the spring centrally thereof. While the socket 18 accommodates bolt head 19 this means may also be employed to advantage for centering the spring 11 with reference to the handling device.

One arm 21 of each of the bell crank members 15 is provided with an open ended slot or recess 22 adapted to receive and accommodate the spring 11 adjacent the ends thereof. These open ended slots or recesses may be conveniently formed by providing each of the arms 21 with an extension 23 provided with a laterally extending projection 24 preferably in the form of a roller. With the handling device in the position shown in Figure 1 the head 19 of the bolt 20 may be engaged with the socket 18 and the ends of the spring slipped into the recess 22. The spring 11 is thus supported in position to be flexed or straightened in a manner to be later described.

The other arm 25 of each of the bell crank members 15 is pivotally connected as at 26 to the piston rod 27 of a piston and cylinder device indicated generally by the reference character 28. The cylinders of these devices are connected together as for instance by means of a link 29.

For supporting the handling device I preferably provide a flexible member 30 suspended from a carriage or pulley 31 movable along a track 32. Air is supplied to the cylinders 28 by means of air supply lines 33 supplied with air from a common supply line 34 in which a valve device 35 is provided.

If the spring has been engaged by the handling device in the manner most clearly illustrated in Figure 1 air under pressure is admitted to the cylinders 28 by properly manipulating valve 35 whereupon piston rods 27 are caused to move in the direction indicated by arrows A in Figure 2. This causes a rocking movement of the bell crank members 15 thus moving the ends of arms 21 upwardly in the direction indicated by arrows B and the socket member 18 downwardly in the direction indicated by arrow C. This causes a flexing of spring 11 whereby the spring is straightened and lengthened in the manner such as suggested in Figure 2. The spring is thus straightened sufficiently so as to permit the ends 14 thereof to be engaged in the supporting brackets or sockets after which the caps 13 are secured in place. The air may then be released from cylinders 28 by properly manipulating valve 35 and the handling device disengaged from the spring.

It will be obvious that with the hereinbefore described construction springs or the like may be readily engaged and handled in such a manner as to facilitate their rapid assembly with for instance the frame of a motor vehicle. With this handling device the springs may be picked up at one point in the assembly line and flexed or straightened and then brought to a position over the frame and engaged therewith in the manner just described.

While an illustrative embodiment of this invention has been described and illustrated herein somewhat in detail it will be readily apparent to those skilled in this art that various changes in many of the essential and all of the non-essential details of the invention may be resorted to without departing from the spirit and scope of this invention and to this end reservation is made to make such changes as may come within the purview of the accompanying claims.

What I claim as my invention is:

1. In a spring handling device of the nature described, the combination with a pair of articulated members adapted to engage said spring intermediate its ends and adjacent its ends, of means for actuating said members whereby said spring may be flexed to lengthen the same.

2. In a spring handling device of the nature described, the combination with a pair of articulated members adapted to engage said spring intermediate its ends and adjacent its ends, of air pressure means for actuating said members whereby said spring may be flexed to lengthen the same.

3. In a spring handling device of the nature described, a pair of articulated members having means for engaging the spring adjacent the center thereof and other means for engaging the spring adjacent the ends thereof and articulated power means connecting said members whereby said members may be actuated to flex said spring in a direction to straighten the same.

4. In a spring handling device of the character described, a pair of bell crank members, means pivotally connecting said members, means at said point of pivotal connection engageable with a spring, means carried by one arm of each bell crank member engageable with the spring adjacent the ends of the latter and power means connected to the other arm of said bell crank members for actuating said members whereby to flex said spring.

5. In a device of the character described, a pair of articulated bell crank levers, means carried by said levers adapted to engage a bowed spring element adjacent its center and adjacent its ends and means for rocking said bell crank levers to flex said element in a direction to lengthen the same.

6. In a device of the character described, a pair of articulated bell crank levers, means carried by said levers adapted to engage a bowed spring element adjacent its center and adjacent its ends and means including air cylinders and pistons connected to said bell crank levers and acting to rock the same whereby to flex said bowed spring element.

7. In a spring handling device of the character described, a pair of bell crank members, means pivotally connecting said members, means at said point of pivotal connection engageable with a spring, a roller carried by one arm of each bell crank member engageable with the spring adjacent the ends of the latter and power means connected to the other arm of said bell crank members for actuating said members whereby to flex said spring.

8. In a device of the class described, a pair of articulated bell crank levers, means carried by said levers adapted to engage a bowed spring element adjacent its center and adjacent its ends, and means for rocking said levers to simultaneously move the center of said springs in one direction and the ends of said spring in an opposed direction.

9. In a device of the class described, a pair of rockable members, means carried by the members adapted to engage a bowed spring element adjacent its center and adjacent its ends, and means for rocking the members to simultaneously move the central portions of the spring element in one direction and the ends thereof in an opposed direction.

In testimony whereof I affix my signature.

SEYMOUR A. AYRES.